United States Patent
Arimitsu (10) Patent No.: US 7,809,411 B2
(45) Date of Patent: *Oct. 5, 2010

(54) POWER SAVING METHOD FOR A MOBILE TERMINAL

(75) Inventor: Kazuhiro Arimitsu, Tokyo (JP)

(73) Assignee: NEC Corporation, Tokyo (JP)

( * ) Notice: Subject to any disclaimer, the term of this patent is extended or adjusted under 35 U.S.C. 154(b) by 955 days.

This patent is subject to a terminal disclaimer.

(21) Appl. No.: 11/469,302

(22) Filed: Aug. 31, 2006

(65) Prior Publication Data

US 2007/0004469 A1  Jan. 4, 2007

Related U.S. Application Data

(62) Division of application No. 10/306,492, filed on Nov. 27, 2002, now Pat. No. 7,146,151.

(30) Foreign Application Priority Data

Nov. 30, 2001 (JP) ............................. 2001-365729

(51) Int. Cl.
*H04M 1/00* (2006.01)
*H04B 1/38* (2006.01)
*H04B 1/16* (2006.01)

(52) U.S. Cl. ................... 455/574; 455/343.2; 455/343.5

(58) Field of Classification Search .............. 455/127.1, 455/127.5, 161.1–3, 343.1–2, 571, 572, 573, 455/574

See application file for complete search history.

(56) References Cited

U.S. PATENT DOCUMENTS

| 5,754,956 A | * | 5/1998 | Abreu et al. ................. 455/434 |
| 6,331,971 B1 | | 12/2001 | Raith |
| 6,542,471 B1 | * | 4/2003 | Ito ............................. 370/252 |
| 2002/0082010 A1 | | 6/2002 | Koorapaty et al. |

(Continued)

FOREIGN PATENT DOCUMENTS

CN        1212597        3/1990

(Continued)

OTHER PUBLICATIONS

Chinese Office Action, dated Feb. 10, 2006 (with English translation).

*Primary Examiner*—George Eng
*Assistant Examiner*—Chayce Bibbee
(74) *Attorney, Agent, or Firm*—Michael Best & Friedrich LLP (57) ABSTRACT

In a CDMA mobile terminal, the power supply voltage of the mobile terminal is compared with a first threshold voltage, and frequency monitor is performed at a normal rate if the power supply voltage is higher than the first threshold voltage, and frequency monitor is performed at 1/N of the normal rate if the power supply voltage is lower than the first threshold voltage, where N is equal to or greater than 2. Additionally, the power level of an RF signal received by the mobile terminal is compared with a first reference level, and frequency monitor is performed at the normal rate if the power level of the RF signal is lower than the first reference level, and frequency monitor is performed at 1/N of the normal rate if the power level of the RF signal is higher than the first reference level.

22 Claims, 11 Drawing Sheets

U.S. PATENT DOCUMENTS

2005/0096053 A1 5/2005 Liu et al.
2005/0250531 A1 11/2005 Takebe et al.

FOREIGN PATENT DOCUMENTS

| | | |
|---|---|---|
| EP | 0 812 119 | 12/1997 |
| GB | 2 305 825 | 4/1997 |
| GB | 2 328 582 | 2/1999 |
| GB | 2 328 588 | 2/1999 |
| GB | 2328588 A * | 2/1999 |
| GB | 2 333 208 | 7/1999 |
| GB | 2 346 293 | 8/2000 |
| JP | 7-326998 | 12/1995 |
| JP | 9-284841 | 10/1997 |
| JP | 10-084572 | 3/1998 |
| JP | 10-209943 | 8/1998 |
| JP | 2000-174689 | 6/2000 |
| JP | 2001-186561 | 7/2001 |
| JP | 2001-1204057 | 7/2001 |
| JP | 2001-285911 | 10/2001 |

* cited by examiner

POWER SAVING METHOD FOR A MOBILE TERMINAL

RELATED APPLICATIONS

This application is a division of U.S. patent application Ser. No. 10/306,492, filed Nov. 27, 2002, which claims priority to Japanese Patent Application No. 2001-365729, filed Nov. 30, 2001.

FIELD OF THE INVENTION

The present invention relates to mobile terminals, as represented by cellular phones, and more specifically to a personal mobile terminal capable of saving its power consumption. The present invention is particularly suitable for CDMA mobile terminals.

BACKGROUND

In mobile communication, as represented by cellular phones, attempts have hitherto been made to lengthen the standby period of the mobile terminal by saving its battery power consumption, and a number of techniques have been developed.

Japanese Patent Publication 2000-174689, for example, discloses a technique in which the portion of a mobile terminal which is not currently operating during a standby mode is set in a power-saving mode or completely deactivated. When the mobile terminal is out of the range of a cell site, it controls the rate at which it receives control data from the network according to the field strength of the receiving signal. The rate of this intermittent mode of reception is also controlled according to the remaining battery power.

In addition, Japanese Patent Publication 10-84572 discloses a technique in which the mobile terminal controls the rate at which it scans the spectrum for signals from the network during a frequency (cell) search according to the amount of time lapsed from the instant it started the cell search. If the lapsed time becomes overly long, mobile terminal reduces the scan rate for saving battery power. The scan rate is also controlled according to the amount of power remains in the battery.

Despite the prior art power saving techniques, the current tendency is toward making a further effort for developing smaller and lighter mobile units with an attendant effort for reducing the size of batteries. On the other hand, the lengthening of the standby period is still in demand. The present invention is intended to achieve battery saving of a mobile terminal while it is within the range of a cell site and is operating in a standby mode, rather than to achieve battery saving of a mobile terminal located in out-of-the-range areas, unable to find a cell site.

The present invention relates to mobile terminals of a CDMA communications system in which the mobile terminals are designed to receive RF signals of different frequencies from a given network or from different networks to monitor their field strengths so that the mobile terminals can operate in an optimum standby mode. More specifically, when the mobile terminal is in a border area of two networks and establishing a communication with a cell-site or in a standby mode using a certain frequency channel, it receives a broadcast command signal from the cell-site. This broadcast signal contains information that specifies frequencies used by other cell sites of the border area. In response, the mobile terminal makes a search for the specified frequencies and detects their field strengths.

The operation of a frequency monitor (or search) requires the mobile terminal to retune its receiver from one frequency to the next. When the receiver is retuned, the channel is switched from one active circuit to an inactive circuit, which takes time to activate. Thus, the time taken to scan across the frequency spectrum is substantial and the amount of power dissipated is greater than is required to monitor a single frequency.

SUMMARY

The present invention is based on a principle that, when a mobile terminal is in a standby mode, battery saving can be achieved by imposing restrictions on the frequency monitor operation which is requested by the network, so that the mobile terminal is able to remain in the standby mode for an extended period of time.

Additionally, the present invention is based on a principle that battery saving can be achieved by reducing the number of cells to be searched, compared to the number of cells usually specified by the network. Currently, the broadcast command signal specifies frequencies of 32 cell sites.

It is therefore an object of present invention to provide a mobile terminal capable of saving power when it is in a standby mode within a service area.

According to a first aspect, a power saving method of the present invention for a mobile terminal comprises the steps of (a) comparing a power supply voltage of the mobile terminal with a first threshold voltage, (b) performing a frequency monitor at a normal rate if the power supply voltage is higher than the first threshold voltage, and (c) performing a frequency monitor at 1/N of the normal rate if the power supply voltage is lower than the first threshold voltage, where N is equal to or greater than 2.

According to a second aspect, a power saving method of the present invention for a mobile terminal comprises the steps of (a) comparing a power level of an RF signal received by the mobile terminal with a first reference level, (b) performing a frequency monitor at a normal rate if the power level of the RF signal is lower than the first reference level, and (c) performing a frequency monitor at 1/N of the normal rate if the power level of the RF signal is higher than the first reference level, where N is equal to or greater than 2.

According to a third aspect, a power saving method of the present invention for a mobile terminal comprises the steps of (a) comparing a travelling speed of the mobile terminal with a first reference speed, and (b) performing a frequency monitor at a normal rate if the travelling speed is lower than the first reference speed, and (c) performing a frequency monitor at 1/N of the normal rate if the travelling speed is higher than the first reference speed, where N is equal to or greater than 2.

According to a fourth aspect of the present invention, there is provided a power saving method for a mobile terminal, which comprises the steps of (a) comparing a power supply voltage of the mobile terminal with a first threshold voltage, (b) performing a frequency monitor on a first plurality of cell-sites if the power supply voltage is higher than the first threshold voltage, and (c) performing a frequency monitor on a second plurality of cell-sites if the power supply voltage is lower than the first threshold voltage, the second plurality of cell-sites are smaller in number than the first plurality of cell-sites.

BRIEF DESCRIPTION OF THE DRAWINGS

The present invention will be described in detail further with reference to the following drawings, in which.

DETAILED DESCRIPTION

Figure 1:
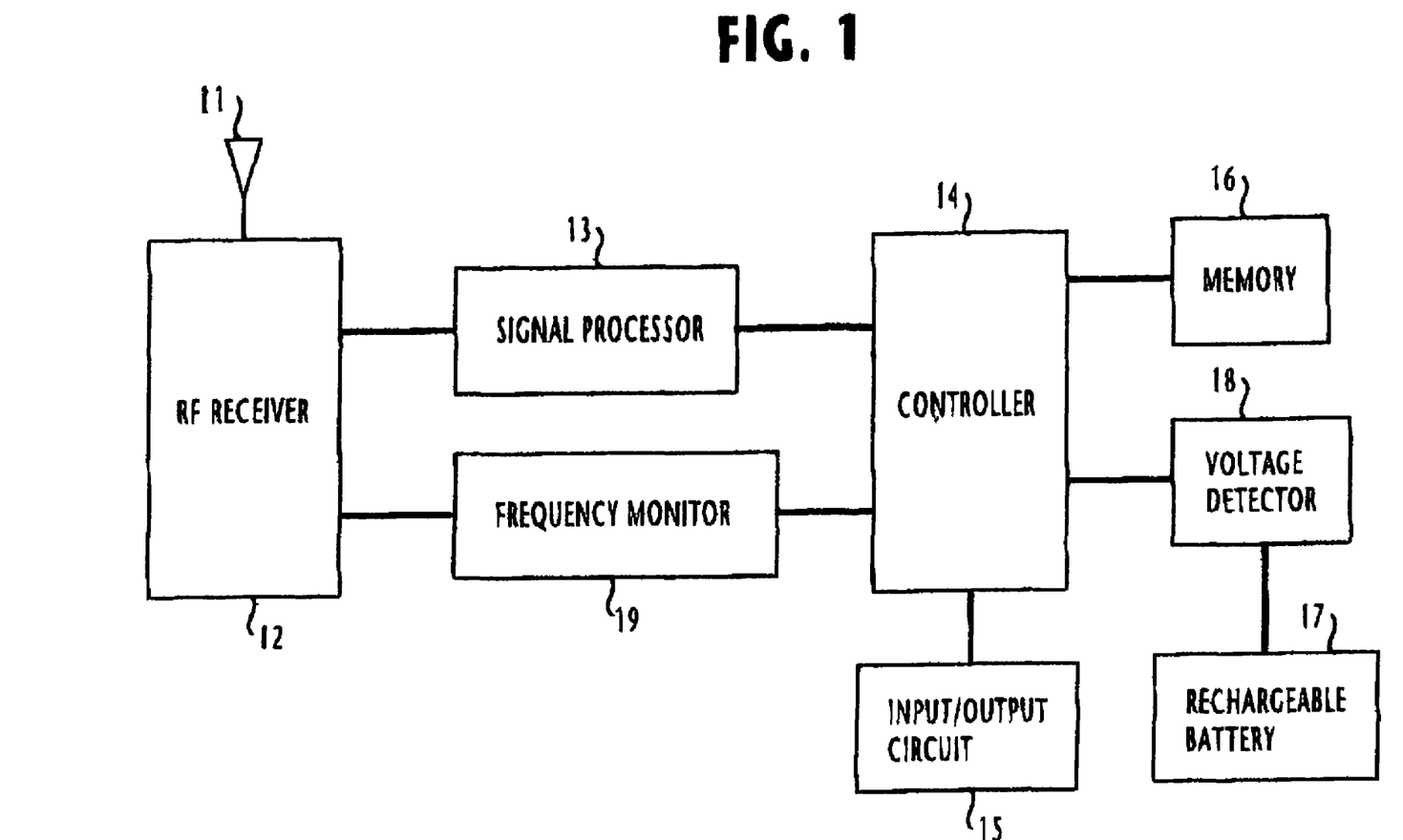
FIG. 1 is a block diagram of a mobile terminal of the present invention for a CDMA cellular communication network.

Referring to FIG. 1, there is shown a communications network incorporating a plurality of test equipment of the present invention.

As shown in FIG. 1, this mobile terminal includes an antenna 11, an RF receiver 12, a signal processor 13, a controller 14, an input/output circuit 15, a memory 16, a power supply 17, a battery voltage detector 18 and a frequency monitor 19.

Antenna 11 receives a downlink signal from a base station (not shown). RF receiver 12 includes an RF amplifier for amplifying the received RF signal, which is down-converted in a down-converter to an intermediate frequency. The IF signal is then converted in an A/D converter to a digital signal. Receiver 12 further includes a field strength detector for detecting the field strength of the received RF signal and informs the controller 14 of the detected field strength value. Signal processor 13 performs a despreading process on the digital signal from the A/D converter of the RF receiver 12 to produce a decoded output signal. Controller 14 performs overall control of the mobile terminal including the processing of the decoded signal of the signal processor 13 and the operation of other circuits of the mobile terminal. Input/output circuit 15 includes a microphone, a speaker, a display and a keypad, and manual control switches. Memory 16 stores various information and a program for operating the mobile terminal. The information stored in the memory 16 includes data for controlling the mobile terminal during a battery saving mode. A rechargeable battery 17 supplies power to all circuitry of the mobile terminal.

Battery voltage detector 18 produces a digital value of the rechargeable battery 17 and feeds its output to the controller 14, which compares it with predetermined threshold voltages to determine the amount of power that remains in the battery. Frequency monitor 19 controls on/off control of the receiver 12 and its scan rate according to a command signal from the controller 14.

Figure 2A:
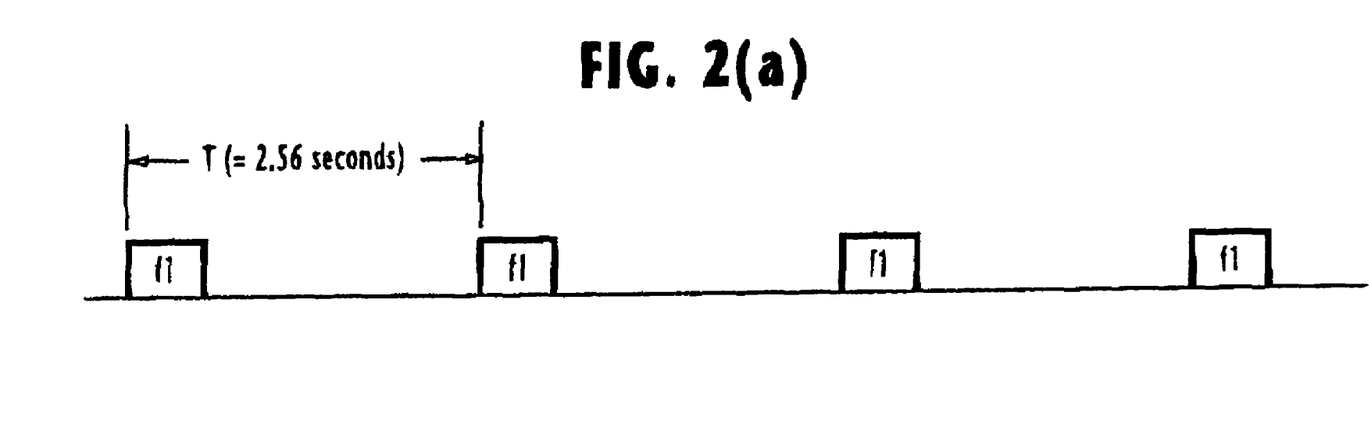
FIG. 2(a) is a timing diagram illustrating the operation of a frequency monitor at normal rate when no other frequencies are specified by the network and FIG. 2(b) is a timing diagram illustrating the operation of a frequency monitor at normal rate when another frequency is specified by the network.
Figure 2B:
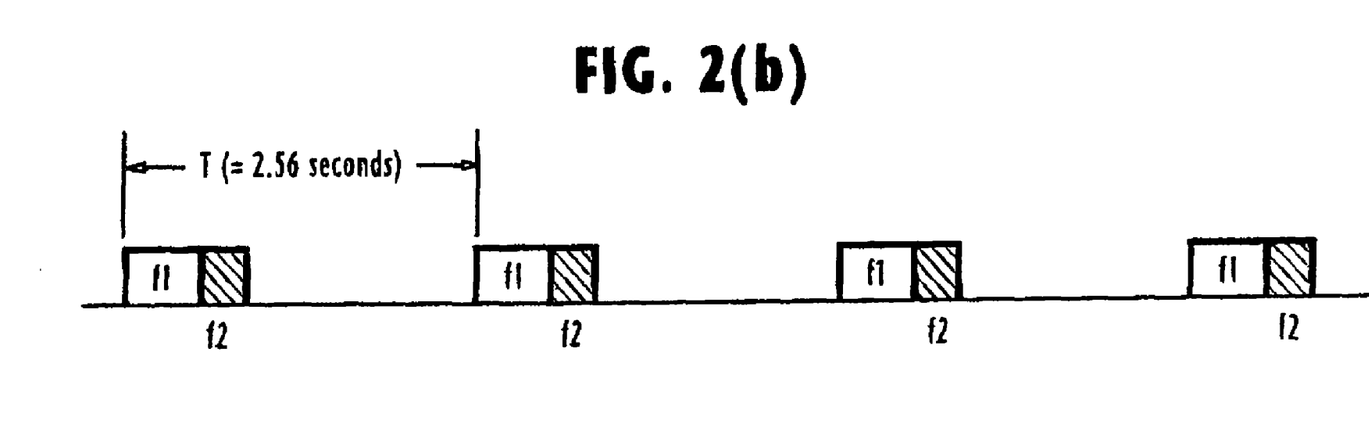
Figure 3:
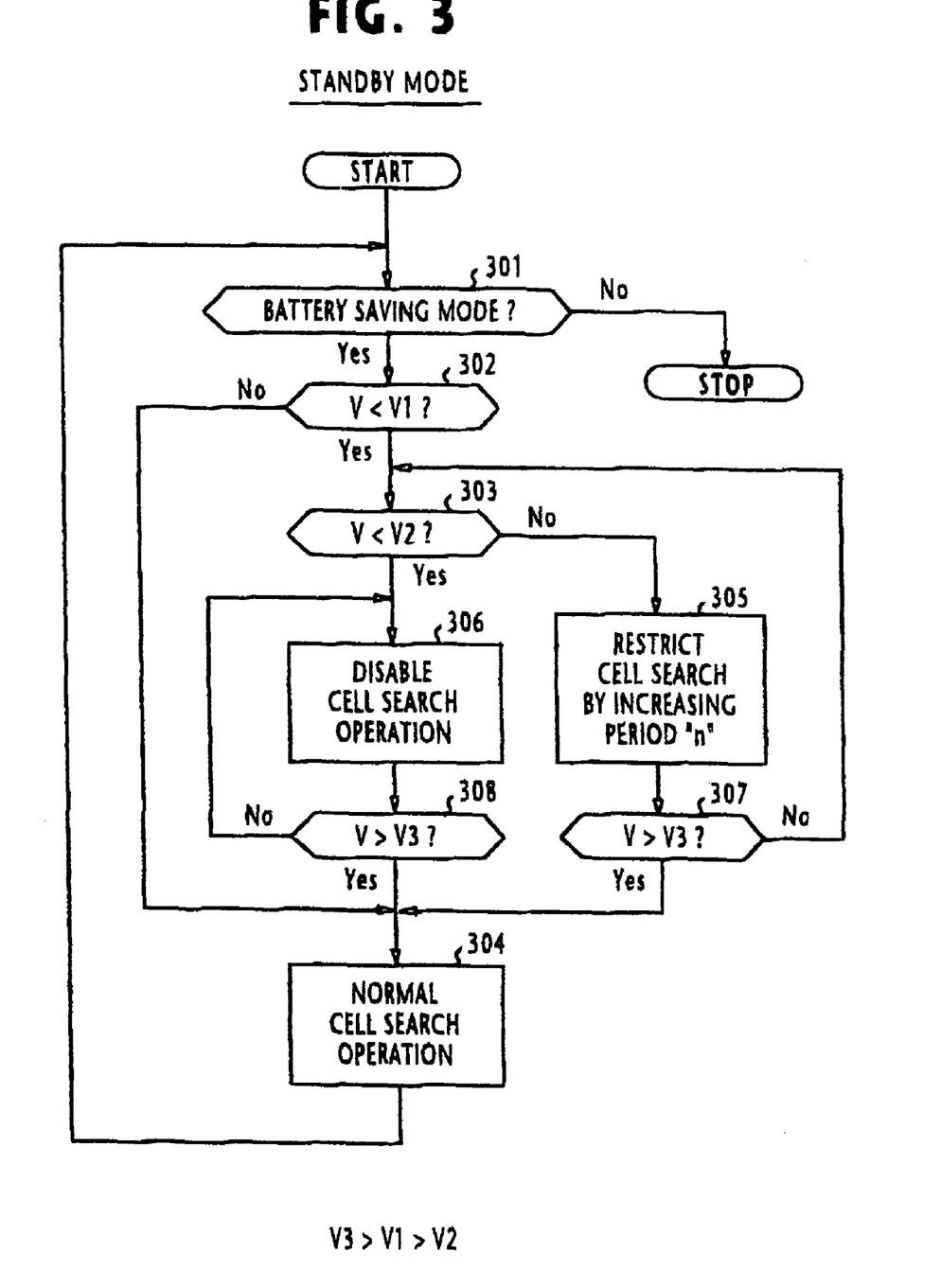
FIG. 3 is a flowchart of the operation of the mobile terminal when battery voltage is used for controlling the rate of the operation of frequency monitor.
Figure 4A:
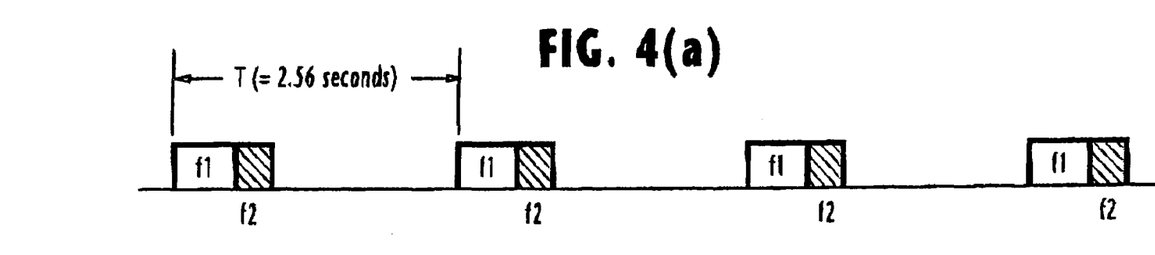
FIG. 4(a) is a timing diagram illustrating the operation of a frequency monitor at normal rate when another frequency is specified by the network.
Figure 4B:
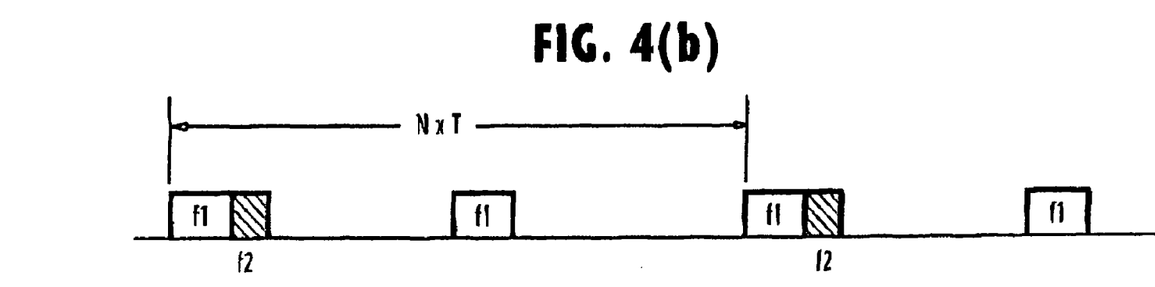
FIG. 4(b) is a timing diagram illustrating the operation of a frequency monitor at 1/N of the normal rate when another frequency is specified by the network.
Figure 4C:
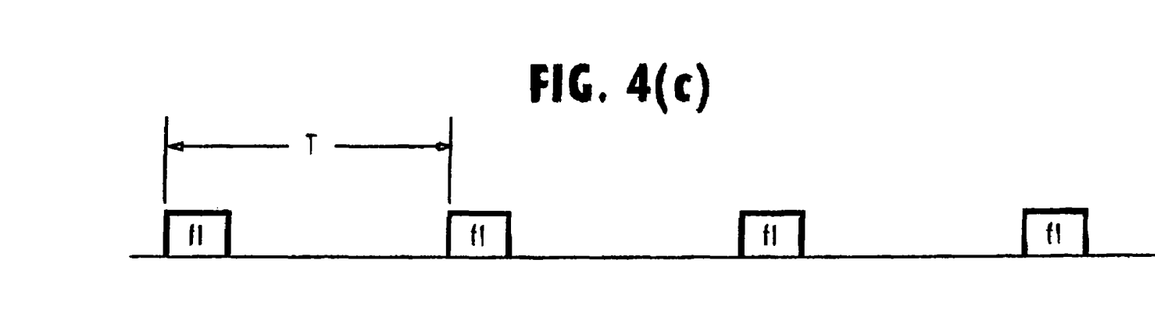
FIG. 4(c) is a timing diagram illustrating the operation of the mobile terminal when the frequency monitor for another frequency is disabled.

The following is a description of the operation of the mobile terminal of FIG. 1 with reference to FIGS. 2 to 4. It is assumed that the mobile terminal is in a standby mode in which it receive a broadcast command signals from one or more base stations at fixed intervals T. Additionally, the mobile terminal allows its user to select, when it is in a standby mode, between a battery saving mode and a normal receive mode.

If the normal receive mode is selected in response to the user entering instruction through the input/output circuit 15, the battery saving on/off flag stored in the memory 16 is set to OFF.

When the mobile terminal enters a standby mode when it has been operating in a normal receive mode, it repeatedly receives a standby signal of frequency f1 with a period T (=2.56 seconds) as shown in FIG. 2(a). Because more than one base station uses the same frequency in a CDMA system for the transmission of downlink signals, the signal received by a mobile terminal usually contains information of a number of base stations.

The received RF signal is down-converted by the RF receiver 12 and decoded by the signal processor 13 to produce an output which corresponds to the signal whose field strength is the highest of the signals it has received from the network. The output of the signal processor 13 is sent to the controller 14 to examine its contents. If the decoded signal do not contain commands such as an alert signal of the arrival of a call, the controller 14 controls its associated circuitry to continue the intermittent reception of the standby signal.

If the decoded signal contains a command instruction that other frequency signal (frequency f2) should be monitored, the controller 14 commands the frequency monitor 19 to intermittently receive the signal of frequency f2 with period T simultaneously with the reception of the current standby signal (frequency f1). The frequency f2 signal is in itself a standby signal similar to the signal the mobile terminal is currently receiving in its standby mode, is treated as a "field strength indication" or "beacon" for power level comparison with the current standby signal.

In response to the command signal from the controller 14, the frequency monitor 19 controls the RF receiver 12 to receive signals of frequencies f1 and f2 as shown in FIG. 2(b). Note that the time taken to detect the field strength from the received other cell-site signal is shorter than is required to extract decoded information from the received standby signal. This is due to the fact that the standby signal needs to be processed through a decoder in order for the controller 14 to examine its contents, whereas the beacon signal is only used to detect its field strength and hence no decoding process is involved.

Controller 14 is informed of the field strength of the beacon signal from the RF receiver 12. Controller 14 compares the field strength of the beacon signal with the field strength of the standby signal. If the field strength of the beacon signal is higher than that of the current standby signal (or higher than a specified level), the controller 14 commands the associated circuitry to switch to the beacon signal to receive it as a new standby signal.

If the broadcast command signal from the network specifies more than one frequency to be monitored, all the specified frequencies are scanned with period T.

Therefore, when the battery saving on/off flag of memory 16 is set to OFF, the mobile terminal responds to a broadcast command signal from the network by performing the intermittent reception of a standby signal of frequency f1 and then performing the intermittent reception of one or more standby signals of different frequencies as beacon signals only if the command signal further includes one or more frequencies other than the frequency of current standby signal. As a result, the operating time of the mobile terminal is longer, hence the power consumption is greater, in cases the broadcast command signal contains frequencies other than the frequency of the current standby signal than in cases it does not.

Battery power is further consumed by the necessity to command the frequency monitor 19 to perform repeated retuning operations between frequencies f1 and f2.

In addition, when the field strength of another cell-site signal becomes higher than the field strength of the current standby signal, the controller 14 commands the receiver to tune to the other cell-site signal as a new standby signal.

Therefore, when the mobile terminal enters a standby mode when it has been operating in a normal receive mode and receives a broadcast command signal from the network, it additionally receives beacon signals if they are specified in the command signal. The mobile terminal performs switching from the current standby signal to a beacon signal if the latter becomes stronger than the former and treats the beacon signal as a standby signal.

When the BS on/off flag in memory 16 is set to ON in response to a command entered through the input/output circuit 15, the mobile terminal operates in a battery saving mode.

During the battery saving mode, the operation of the mobile terminal in a standby mode proceeds according to the output signal from the battery voltage detector 18. The operation of this standby mode proceeds according to a flowchart shown in FIG. 3.

When the mobile terminal receives a broadcast command signal from the network, which instructs it to receive one or more RF signals whose frequencies are specified in the command signal, the controller 14 checks the BS on/off flag stored in the memory 16 to see if it is ON or OFF (step 301). If the BS on/off flag is set to OFF in memory 16, flow proceeds to the end of the routine, which corresponds to the operation just described.

If the BS on/off flag of memory 16 is set to "ON", the controller 16 proceeds to check the output voltage (V) of the battery voltage detector 18 against first and second threshold voltages V1 and V2 (steps 302,303).

If the output of battery voltage detector 18, which represents the digital value of the battery voltage, V, is equal to or greater than the first threshold voltage V1, the decision at step 302 is negative and the controller 14 proceeds to step 304 to operate the mobile terminal in a normal receive mode. As a result, the mobile terminal receives the standby signal (f1) and other frequency signal (f2) intermittently with period T as shown in FIG. 4(a).

If the battery voltage V detected by voltage detector 18 is lower than the first threshold voltage V1 and equal to or higher than the second threshold voltage V2, the decision at step 302 is affirmative and the decision at step 303 is negative. Controller 14 proceeds from step 303 to step 305 to perform a limited cell-search operation. More specifically, when the battery voltage drops below threshold voltage V1, the controller 14 sends a command signal to the frequency monitor 19 to cause it to tune to frequency f2 to monitor a signal from other base station intermittently with period n×T (where n is an integer equal to or greater than 2 and the integer n is appropriately determined based on the configuration of the network). Frequency monitor 19 controls the RF receiver 12 to receive the standby signal intermittently with period T and the signal of the specified frequency from other base station intermittently with (n×T) period, as shown in FIG. 4(b). In this way the mobile terminal of this embodiment, the rate at which the frequencies are switched and the time taken to receive a given frequency signal and the time taken to compare power levels, and hence the amount of power dissipated is reduced. Step 305 thus saves battery power required to perform a frequency monitor by imposing restrictions on its operation. This results in a lengthening of the standby period.

As steps 303, 305, 307 are repeatedly executed or looped, a characteristic known as hysteresis is produced and the limited frequency monitor operation is maintained even if the first threshold voltage is exceeded due to the occurrence of some erratic voltage drop in the battery 17. Therefore, once the battery voltage V has dropped below the first threshold voltage V1, the limited frequency monitor operation continues until it further drops below the second threshold voltage V2.

If the battery voltage V detected by the voltage detector 18 is lower than the second threshold voltage V2, the controller 14 makes affirmative decisions at both steps 302 and 303 and proceeds to step 306 to disable the frequency monitor operation. Thus, the controller 14 instructs the frequency monitor 19 to cease its monitoring operation so that the signal at frequency f2 from other base station is not monitored. In response, the frequency monitor 19 controls the RF receiver 12 to receive exclusively the standby signal intermittently with period T as shown in FIG. 4(c). Although the mobile terminal cannot establish a link with other base station, it can still maintain communication with the current base station over the channel of frequency f1. Standby period is lengthened in this way.

If the decision at step 307 is negative, flow returns to step 303 to repeat step 305, so that step 305 is repeated until the battery voltage V drops below the lower threshold voltage V2 (step 303) or exceeds a third threshold voltage V3 (step 307). If the decision at step 308 is negative, flow returns to step 306, so that step 306 is continued until the battery voltage rises above the higher threshold voltage V3. Threshold voltage V3 is the highest reference voltage which is higher than the first threshold voltage V1 and indicates that the battery 17 is fully charged. Therefore, the controller 14 repeatedly executes steps 305 and 306 until the battery 17 is recharged to normal level (steps 307 and 308). If the decision at step 307 or 308 is affirmative, flow returns to step 304 to set the mobile terminal to normal frequency monitor operation.

Figure 5A:
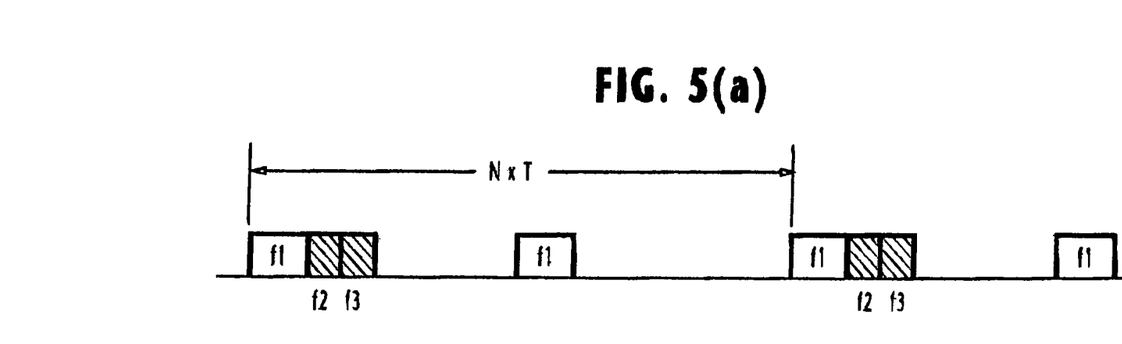
FIG. 5(a) is a timing diagram illustrating the operation of the mobile terminal when two other frequencies are specified by the network which are monitored at 1/N of the normal rate.
Figure 5B:
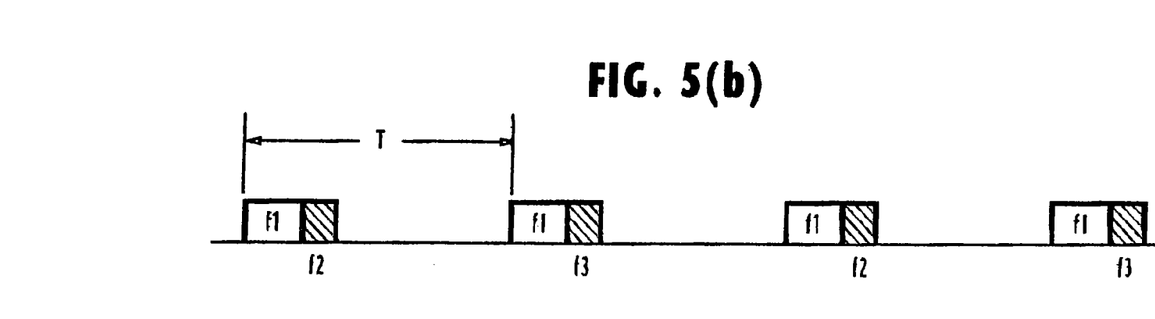
FIG. 5(b) is a timing diagram illustrating the operation of the mobile terminal when two other frequencies are specified by the network which are alternately monitored at normal rate.
Figure 5C:
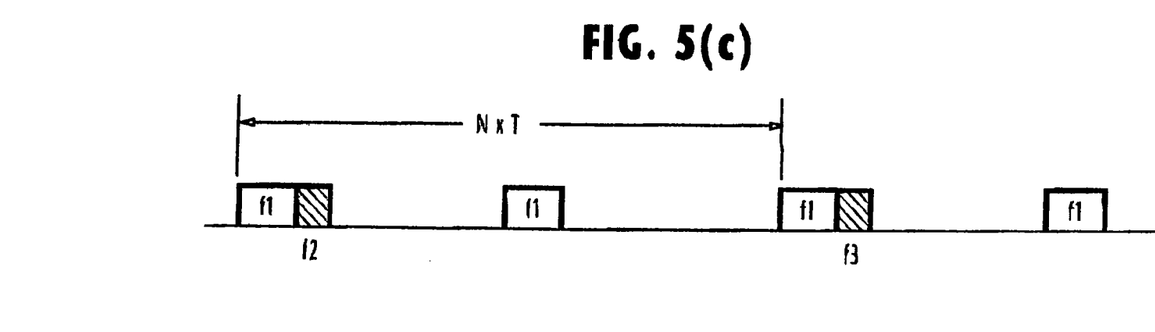
FIG. 5(c) is a timing diagram illustrating the operation of the mobile terminal when two other frequencies are specified by the network which are alternately monitored at 1/N of the normal rate.

If multiple other frequency signals are specified in the broadcast command signal, the degree of restrictions imposed on the cell-search operation at step 305 may be varied stepwise according to decreasing battery voltage. Assume that two frequencies f2 and f3 are specified in the broadcast command signal. If the lower-than-V1 battery voltage V is relatively high, the signals of frequencies f2 and f3 are repeatedly received following the current standby signal (f1) with (n×T) period, as shown in FIG. 5(a). If the lower-than-V1 battery voltage drops, signals f2 and f3 are alternately selected with period T so that each of the selected signals immediately follows each occurrence of the current standby signal, as shown in FIG. 5(b). If the lower-than-V1 battery voltage further drops, signals f2 and f3 are alternately selected with period n×T so that the selected signals follow every other occurrences of the current standby signal, as shown in FIG. 5(c). Additionally, if three or more other frequency signals are specified in the broadcast command signal, two or three frequencies may be selected in a predefined order with (n×T) period.

Battery savings is achieved to increase the standby period by imposing restrictions on the frequency monitor operation when the battery voltage drops below some voltage level and completely shutting the frequency monitor off if the battery drops below some critical low level.

Figure 6:
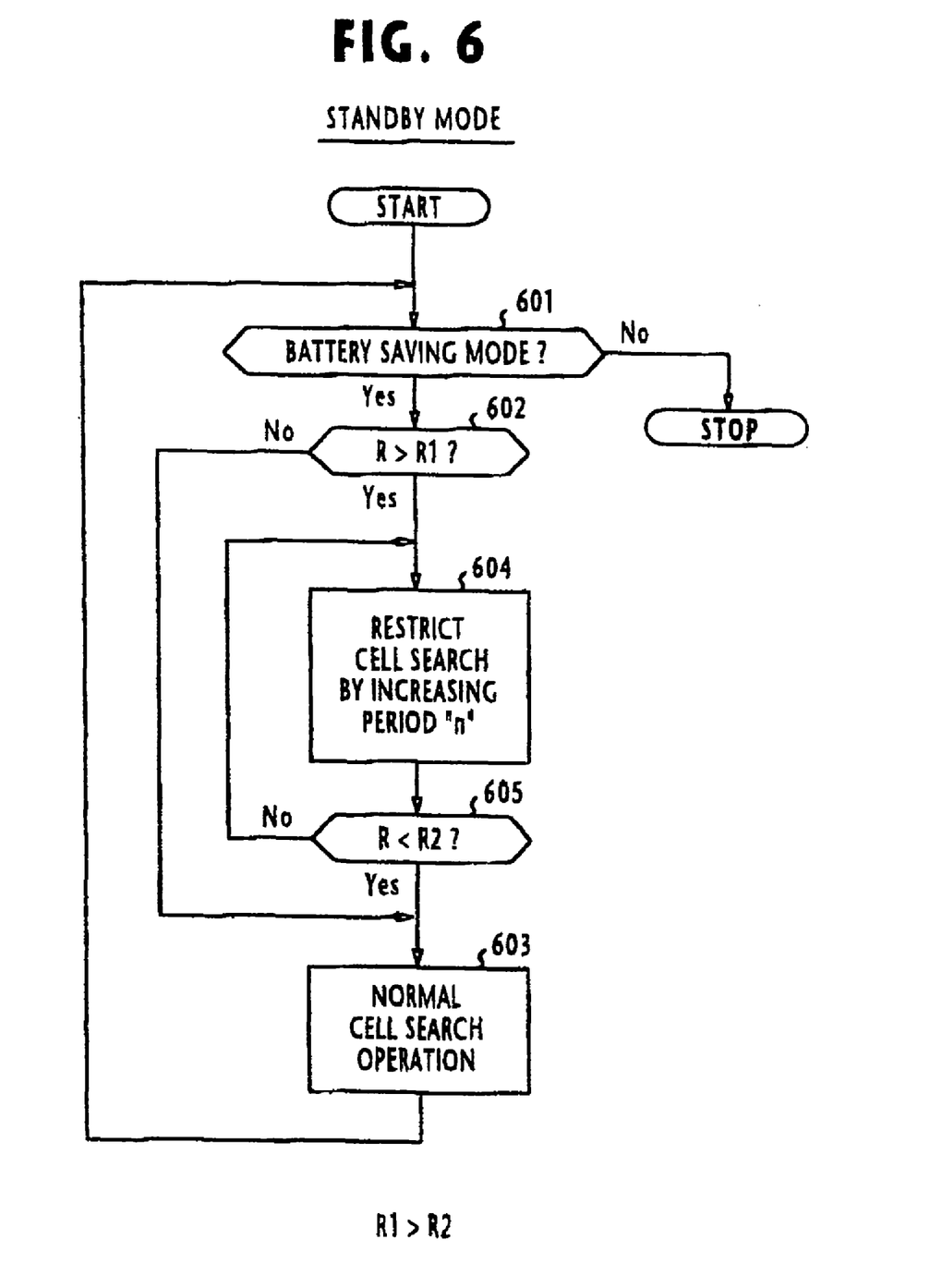
FIG. 6 is a flowchart of the operation of the mobile terminal when the field strength of a received RF signal is used for controlling the rate of frequency monitor operation.

The following is a description of a second embodiment the present invention with reference to FIG. 6.

When the command signal broadcast from the network specifies that a frequency f2 signal should be monitored, the controller 14 examines the battery saving on/off flag in memory 16 (step 601). If the battery saving on/off flag of memory 16 is set to OFF, the routine is terminated, so that the current standby signal and other cell-site signals specified by the broadcast command signal from the network are intermittently received with period T.

If the battery saving on/off flag of memory 16 is set to ON, the controller 14 proceeds from step 601 to step 602 to compare the field strength (R) signal from the receiver 12 indicating the power level of the current standby signal with a first reference power level R1 (step 602).

If the power level R of the current standby signal is equal to lower than R1, flow proceeds from step 602 to step 603 to perform the normal frequency monitor operation in which RF signals are received intermittently with period T, so that the frequency monitor 19 is instructed accordingly. Since the standby signal is weak, there is a high likelihood of the mobile terminal to switch to a new cell-site. As a result, intermittent frequency monitor operation is performed with period T at step 603 in order to quickly find the new cell-site.

If R>R1, the current standby signal is strong and hence the likelihood of the mobile terminal to switch to a new cell-site is slight. Therefore, the controller 14 proceeds to step 604 to impose restrictions on the frequency monitor operation by lengthening its cycle period of search for frequencies specified in the broadcast command signal. Thus, one or more frequencies specified by the broadcast command signal are intermittently scanned with period (n×T). Frequency controller 19 is instructed by the controller 14 accordingly to cause the receiver 12 to receive RF signals for the limited frequency monitor operation.

Steps 602 is repeatedly executed to continue the limited frequency monitor operation until the power level R of the standby signal drops below a second reference power level R2 which is lower than the first reference power level R1. Specifically, the controller 14 compares the power level R of the standby signal with the second reference power level R2 at step 605 and continues the limited frequency monitor until the power level R drops below the lower reference level R2, whereupon flow proceeds to step 603.

In this way, the power consumption of a mobile terminal is reduced according to the field strength of the standby signal and hence the standby period is lengthened.

Figure 6A:
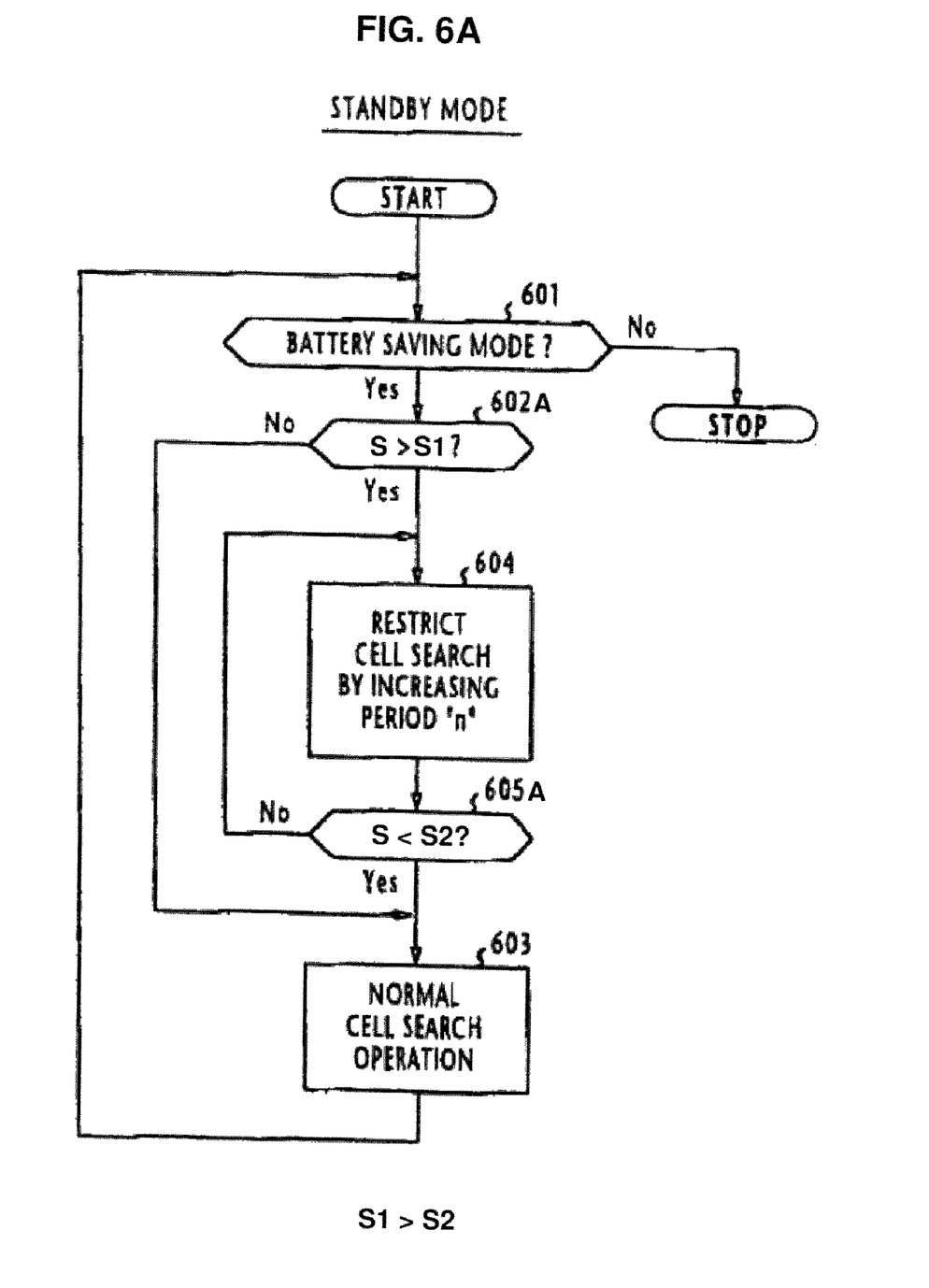
FIG. 6A is a flowchart of the operation of the mobile terminal when the travelling speed of a mobile terminal is used for controlling the rate of frequency monitor operation.

When travelling on a vehicle, the mobile terminal would be required to perform frequency monitor operations each time it crosses a cell boundary. If the mobile's travelling speed increases, the number of such instances increases with a resultant increase in power consumption. Instead of the field strength of the standby signal, the travelling speed of a mobile terminal can be used for battery savings purposes (FIGS. 6A, 7A). If the mobile terminal includes a navigation feature using the GPS system or location information services provided by mobile networks, the mobile's travelling speed can be obtained by calculating location information from the GPS or location information system. In FIG. 6A, if the mobile's travelling speed "S" is higher than a first reference speed S1, restrictions are imposed on the frequency monitor operation (step 604) until the mobile speed drops below a second reference speed S2 which is lower than the first reference speed S1 (step 605A). As a result, restrictions are imposed on the frequency monitor operation to save the battery power when the travelling speed of the mobile terminal increases.

Figure 7:
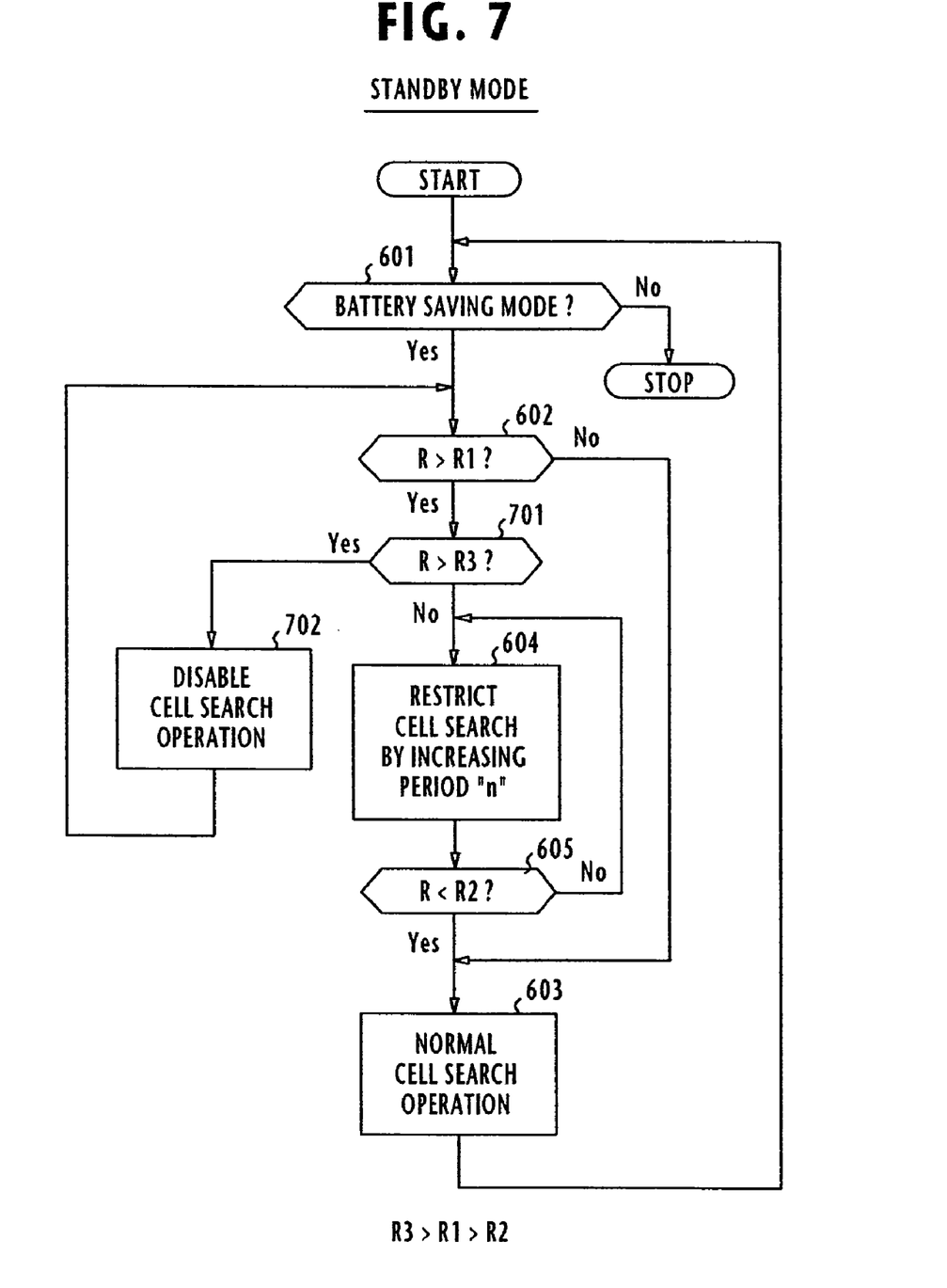
FIG. 7 is a modified flowchart of FIG. 6.
Figure 7A:
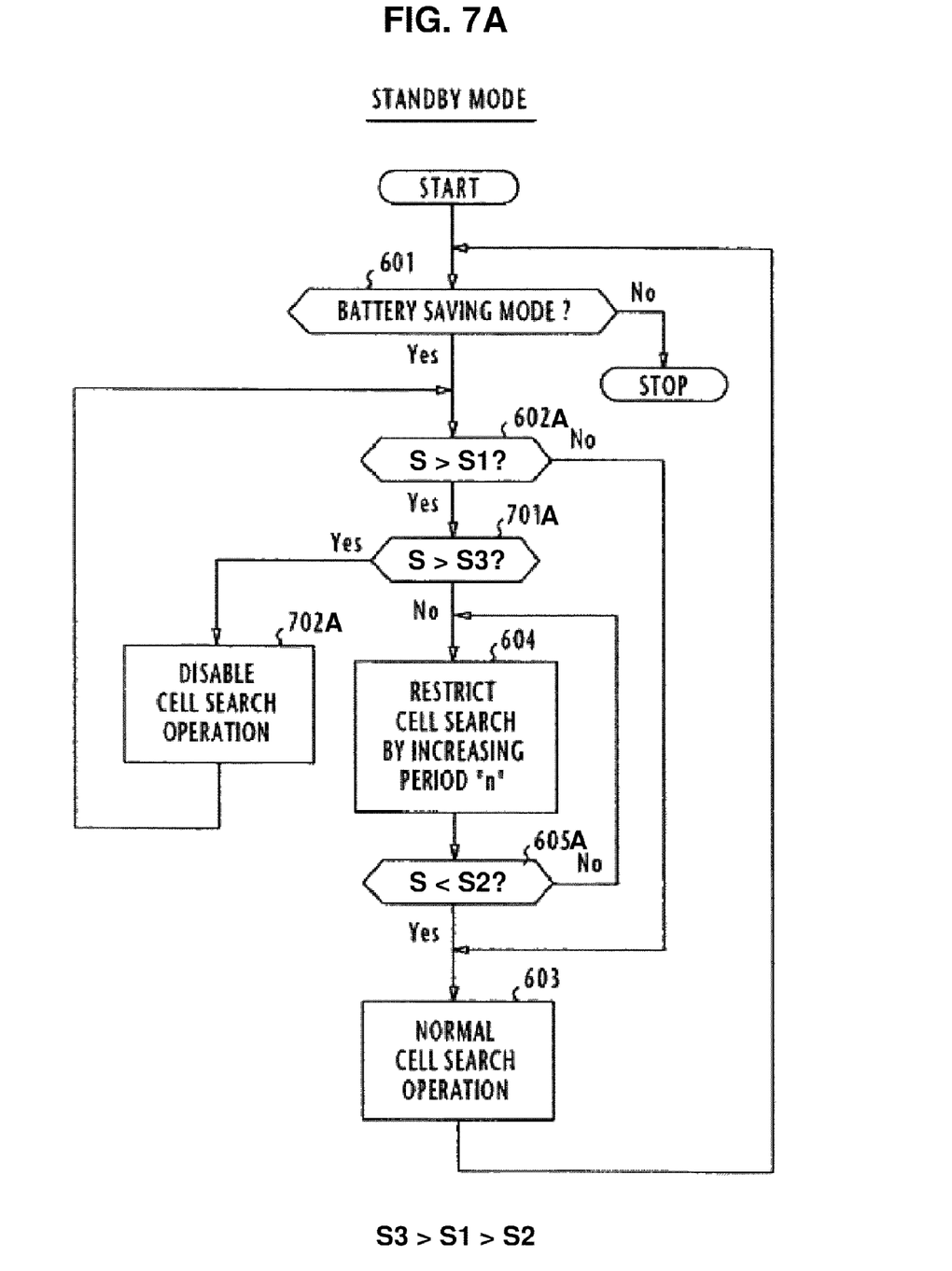
FIG. 7A is a modified flowchart of FIG. 6A.

FIG. 6 may be modified as shown in FIG. 7 by including additional steps 701 and 702. Step 701 is executed when the decision at step 602 is affirmative to compare the power level R of the current standby signal with a third reference power level R3, which is higher than the first reference power level R1. If the power level R is lower than R3, the decision is negative at step 701, flow proceeds to step 604 to restrict the cell search at 1/N the rate of normal rate. If R>R3, the decision at step 701 is affirmative, and flow proceeds to step 702 to disable the frequency monitor and returns to step 602.

In the same way as described above, the travelling speed is also used as a variable in FIG. 7A instead of the power level R of the received standby signal. FIG. 6A may be modified as shown in FIG. 7A by including additional steps 701A and 702A. Step 701A is executed when the decision at step 602A is affirmative to compare the travelling speed S with a third reference travelling speed S3, which is higher than the first reference travelling speed S1. If the travelling speed S is lower than S3, the decision is negative at step 701A, flow proceeds to step 604 to restrict the cell search at 1/N the rate of normal rate. If S>S3, the decision at step 701A is affirmative, and flow proceeds to step 702A to disable the frequency monitor and returns to step 602A.

Figure 8:
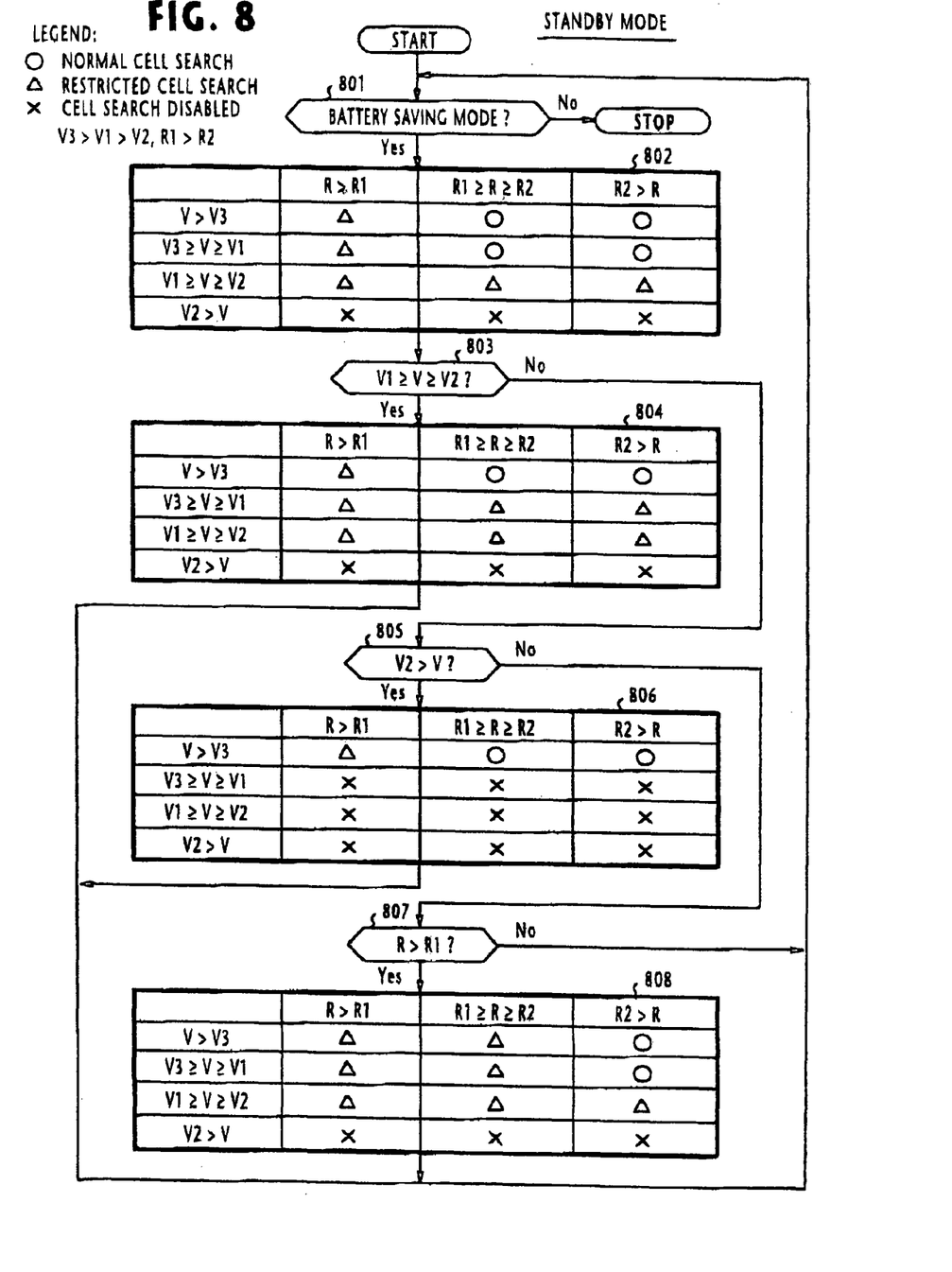
FIG. 8 is a combined form of the flowcharts of FIGS. 3 and 6.

The various features of the embodiments of FIGS. 3 and 6 are combined in a flowchart shown in FIG. 8.

If the battery saving mode of the mobile terminal is set to ON, the decision at step 801 is affirmative and flow proceeds to step 802 to perform normal or restricted frequency (other than f1) monitor operation or disable the frequency (other than f1) monitor operation, depending on a combination of a set of battery voltages and a set of field strengths.

1) If V>V3 and R>R1, other-frequency monitor operation is restricted in the same manner as described previously, and if V>V3 and R1≧R≧R2 or R2>R, normal other-frequency monitor is performed;

2) If V3≧V≧V1 and R>R1, other-frequency monitor operation is restricted, and if V3≧V≧V1 and R1≧R≧R2 or R2>R, normal other-frequency monitor is performed;

3) If V1≧V≧V2, other-frequency monitor operation is restricted; and

4) If V2>V, other-frequency monitor operation is disabled.

Flow proceeds from step 802 to step 803 to check to see if the relation V3≧V≧V1 is established while the field strength value R remains unchanged. If this is the case, flow branches out to step 804 to perform the following operations:

5) If V>V3 and R>R1, other-frequency monitor operation is restricted, and if V>V3 and R1≧R≧R2 or R2>R, normal other-frequency monitor is performed;

6) If V3≧V≧V1, other-frequency monitor operation is restricted;

7) If V1≧V≧V2, other-frequency monitor operation is restricted; and

8) If V2>V, other-frequency monitor operation is disabled.

If the decision at step 803 is negative, flow branches out to step 805 to determine if V2>V. If so, flow proceeds to step 806 to perform the following operations:

9) If V>V3 and R>R1, other-frequency monitor operation is restricted, and if V>V3 and R1≧R≧R2 or R2>R, normal other-frequency monitor is performed;

10) If V3≧V≧V1, other-frequency monitor operation is disabled;

11) If V1≧V≧V2, other-frequency monitor operation is disabled; and

12) If V2>V, other-frequency monitor operation is disabled.

If the decision at step 805 is negative, flow proceeds to step 807 to determine if R>R1. If so, flow proceeds to step 806 to perform the following operations:

13) If V>V3 and R>R1 or R1≧R≧R2, other-frequency monitor operation is restricted, and if V>V3 and R2>R, normal other-frequency monitor is performed;

14) If V3≧V≧V1 and R>R1 or R1≧R≧R2, other-frequency monitor operation is restricted, and if V3≧V≧V1 and R2>R, normal other-frequency monitor is performed;

15) If V1≧V≧V2, other-frequency monitor operation is restricted; and

16) If V2>V, other-frequency monitor operation is disabled.

If the decision at step 807, flow returns to step 801.

In cases where V and R simultaneously vary, it will be seen from steps 804, 806 and 808 that, once the frequency monitor operation is restricted or disabled, normal frequency monitor operation is resumed only if V>V3 and R<R2.

Variations of FIG. 8 are apparent to those skilled in the art. For example, in steps 802 and 804, other-frequency monitor operation is restricted, instead of being disabled, even if V2>V in cases where R2>R. Additionally, in the case of step 806, other-frequency monitor operation is restricted, instead of being disabled, if V3>V>V2.

Frequency monitor operation is also performed by a mobile terminal when it attempts register its location to the mobile network. During a location registration mode, the mobile terminal is usually required to search as many as 32 cell-sites for a signal having highest field strength. Since the mobile terminal is required to monitor signals of the same frequency transmitted from the 32 cell-sites, the search block of the mobile terminal is operated 32 times in succession. Therefore, the time taken for a mobile terminal to complete a location registration process, and hence the consumption of its battery power, is proportional to the number of target cell-sites.

Figure 9:
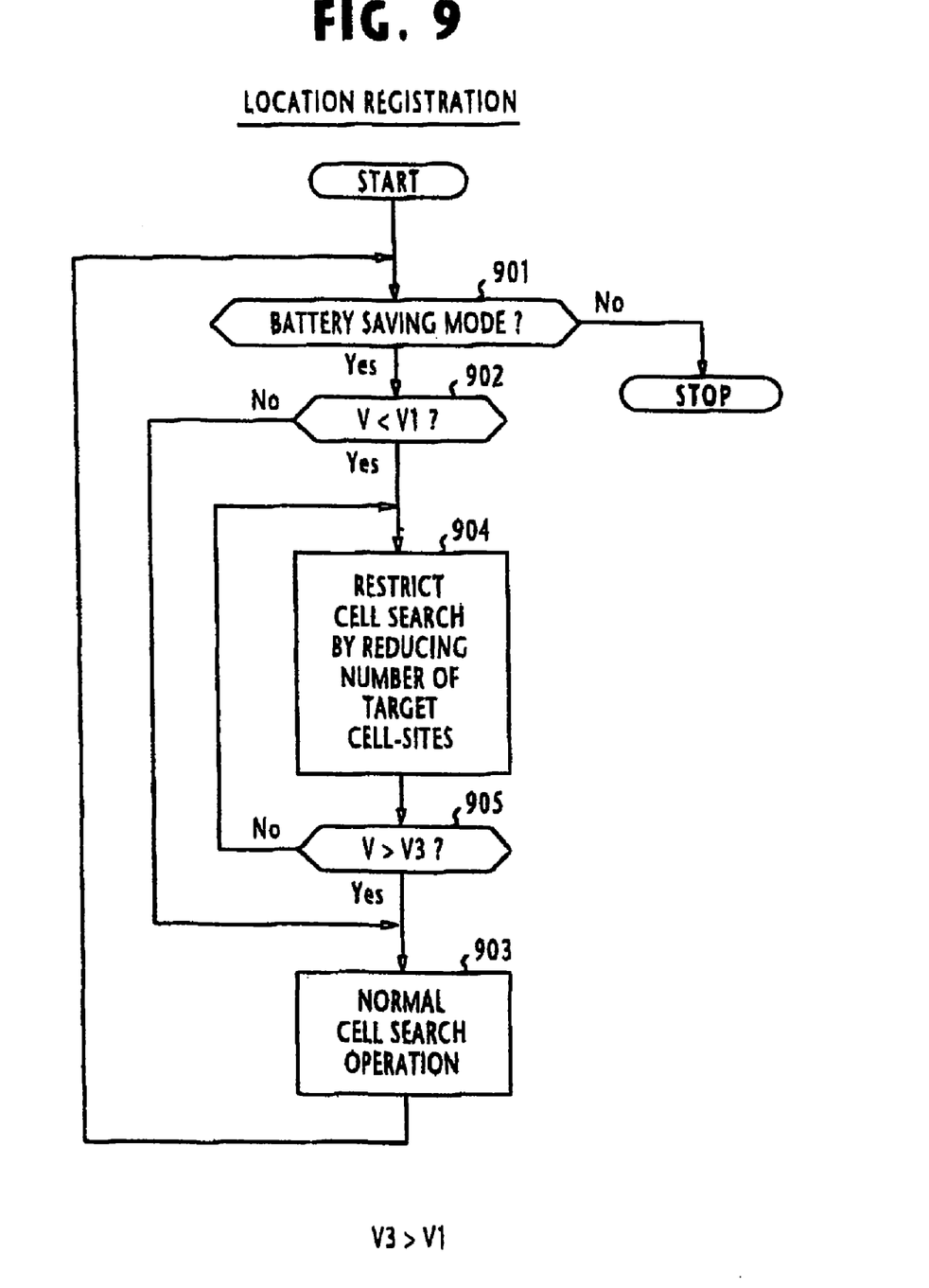
FIG. 9 is a flowchart of the operation of the mobile terminal when battery voltage is used for reducing the number of target cell-sites during location registration.

A flowchart shown in FIG. 9 illustrates the operation of the mobile terminal that saves battery power during a location registration mode.

In FIG. 9, if the battery saving on/off flag of memory 16 is set to ON, the battery voltage V is compared with the threshold voltage V1. If V≧V1, the controller 14 proceeds to step 903 to perform normal frequency monitor operation. If V>V1, the controller proceeds to step 904 to restrict the frequency monitor operation by reducing the number of target cell-sites and performs a frequency monitor on a smaller number of base stations than it does on the base stations at step 903. Step 904 is repeated until the battery voltage drops below the threshold voltage V3 at step 905, whereupon flow proceeds to step 903.

It is apparent to those skilled in the art to combine the features of the previous embodiments with the flowchart of FIG. 9.

What is claimed is:

1. A power saving method for a mobile terminal, comprising the steps of:
   a) comparing a power supply voltage of the mobile terminal with a first threshold voltage and comparing a travelling speed of the mobile terminal with a first reference speed;
   b) performing a frequency monitor at a normal rate if the power supply voltage is higher than the first threshold voltage and the travelling speed is lower than the first reference speed; and
   c) performing a frequency monitor at 1/N of said normal rate if the power supply voltage is lower than the first threshold voltage or if the travelling speed is higher than the first reference speed, where N is equal to or greater than 2.

2. The power saving method of claim 1, wherein step (c) comprises the steps of:
   comparing the power supply voltage with a second threshold voltage which is lower than the first threshold voltage; and
   performing a frequency monitor at 1/N of said normal rate until said power supply voltage drops below said second threshold voltage.

3. The power saving method of claim 2, further comprising the step of disabling said frequency monitor if the power supply voltage is lower than said second threshold voltage.

4. The power saving method of claim 3, further comprising the steps of:
   comparing the power supply voltage with a third threshold voltage which is higher than said first threshold voltage; and
   performing a frequency monitor at said normal rate when the power supply voltage is higher than said third threshold voltage.

5. The power saving method of claim 1, wherein step (c) comprises the step of performing said frequency monitor on a varying number of different frequencies at 1/N of said normal rate, depending on different magnitudes of the power supply voltage.

6. The power saving method of claim 1, wherein step (c) comprises the steps of:
   comparing said travelling speed with a second reference speed which is lower than the first reference speed; and
   continuing the frequency monitor at 1/N of said normal rate until said travelling speed drops below said second reference speed.

7. The power saving method of claim 6, further comprising the steps of:
   comparing said travelling speed with a third reference speed which is higher than the first reference speed; and
   disabling said frequency monitor when the travelling speed is higher than said third reference speed.

8. A power saving method for a mobile terminal, comprising the steps of:
   a) comparing a travelling speed of the mobile terminal with a first reference speed; and
   b) performing a frequency monitor at a normal rate if the travelling speed is lower than the first reference speed; and c) performing a frequency monitor at 1/N of said normal rate if the travelling speed is higher than the first reference speed, where N is equal to or greater than 2.

9. The power saving method of claim 8, wherein step (c) comprises the steps of:
comparing said travelling speed with a second reference speed which is lower than the first reference speed; and
continuing the frequency monitor at 1/N of said normal rate until said travelling speed drops below said second reference speed.

10. The power saving method of claim 9, further comprising the steps of:
comparing said travelling speed with a third reference speed which is higher than the first reference speed; and
disabling a frequency monitor when the travelling speed is higher than said third reference speed.

11. The power saving method of claim 1 or 8, wherein said mobile terminal is a CDMA mobile terminal.

12. A mobile terminal comprising:
receiver circuitry for establishing a wireless link with a communications network;
monitor circuitry connected to the receiver circuitry for performing a frequency monitor by scanning one or more frequencies specified by the network other than the frequency of said wireless link; and
control circuitry for comparing a power supply voltage of the mobile terminal with a first threshold voltage and controlling said monitor circuitry to perform said frequency monitor at a normal rate if the power supply voltage is higher than the first threshold voltage and to perform said frequency monitor at 1/N of said normal rate if the power supply voltage is lower than the first threshold voltage, where N is equal to or greater than 2, wherein said control circuitry is arranged to:
compare a travelling speed of the mobile terminal with a first reference speed; and
control said monitor circuitry to perform said frequency monitor at said normal rate if the travelling speed is lower than the first reference speed; and at 1/N of said normal rate if the travelling speed is higher than the first reference speed.

13. The mobile terminal of claim 12, wherein said control circuitry compares the power supply voltage with a second threshold voltage which is lower than the first threshold voltage and controls said frequency monitor to perform said frequency monitor at 1/N of said normal rate until said power supply voltage drops below said second threshold voltage.

14. The mobile terminal of claim 13, wherein said control circuitry disables said monitor circuitry if the power supply voltage is lower than said second threshold voltage.

15. The mobile terminal of claim 14, wherein said control circuitry compares the power supply voltage with a third threshold voltage which is higher than said first threshold voltage and controls said monitor circuitry to perform said frequency monitor at said normal rate when the power supply voltage is higher than said third threshold voltage.

16. The mobile terminal of claim 12, wherein the control circuitry controls said monitor circuitry to perform said frequency monitor on a varying number of different frequencies at 1/N of said normal rate, depending on different magnitudes of the power supply voltage.

17. The mobile terminal of claim 12, wherein said control circuitry is arranged to:
compare said travelling speed with a second reference speed which is lower than the first reference speed; and
control said monitor circuitry to continue the frequency monitor at 1/N of said normal rate until said travelling speed drops below said second reference speed.

18. The mobile terminal of claim 17, wherein said control circuitry is arranged to:
compare said travelling speed with a third reference speed which is higher than the first reference speed; and
disable said monitor circuitry when the travelling speed is higher than said third reference speed.

19. A mobile terminal comprising:
receiver circuitry for establishing a wireless link with a communications network;
monitor circuitry connected to the receiver circuitry for performing a frequency monitor by scanning one or more frequencies specified by the network other than the frequency of said wireless link; and
control circuitry for comparing a travelling speed of the mobile terminal with a first reference speed and performing a frequency monitor at a normal rate if the travelling speed is lower than the first reference speed and at 1/N of said normal rate if the travelling speed is higher than the first reference speed, where N is equal to or greater than 2.

20. The mobile terminal of claim 19, wherein said control circuitry compares said travelling speed with a second reference speed which is lower than the first reference speed and controls said monitor circuitry to continue the frequency monitor at 1/N of said normal rate until said travelling speed drops below said second reference speed.

21. The mobile terminal of claim 20, wherein said control circuitry compares said travelling speed with a third reference speed which is higher than the first reference speed and disables said monitor circuitry when the travelling speed is higher than said third reference speed.

22. The mobile terminal of claim 12 or 19, wherein said receiver circuitry is a CDMA receiver.

* * * * *